(12) United States Patent
Leplingard et al.

(10) Patent No.: US 7,136,401 B2
(45) Date of Patent: Nov. 14, 2006

(54) MULTIPLE OUTPUT RAMAN FIBER LASER WITH STABLE AND SMALL OUTPUT POWER FOR SEED APPLICATIONS

(75) Inventors: Florence Leplingard, Versailles (FR); Catherine Martinelli, Palaiseau (FR); Sophie Borne, D'Huison Longueville (FR); Carlos De Barros, Boulogne-Billancourt (FR); Thierry Lopez, Paris (FR)

(73) Assignee: Alcatel, Paris (FR)

( * ) Notice: Subject to any disclaimer, the term of this patent is extended or adjusted under 35 U.S.C. 154(b) by 303 days.

(21) Appl. No.: 10/781,626

(22) Filed: Feb. 20, 2004

(65) Prior Publication Data
US 2004/0174913 A1 Sep. 9, 2004

(30) Foreign Application Priority Data
Mar. 3, 2003 (EP) .................................. 03290493

(51) Int. Cl.
*H01S 3/30* (2006.01)
(52) U.S. Cl. ............................................. 372/6; 372/3
(58) Field of Classification Search .................... 372/6, 372/3, 32, 96, 102
See application file for complete search history.

(56) References Cited

U.S. PATENT DOCUMENTS 5,511,083 A * 4/1996 D'Amato et al. .............. 372/6
6,310,899 B1 * 10/2001 Jacobovitz-Veselka et al. 372/6
6,407,855 B1 * 6/2002 MacCormack et al. ...... 359/346
6,594,288 B1 * 7/2003 Putnam et al. .................. 372/3
6,836,488 B1 * 12/2004 Bayart et al. ................... 372/3

FOREIGN PATENT DOCUMENTS

| WO | WO 02/075391 A2 | | 9/2002 |
| WO | WO 03/005068 | * | 1/2003 |
| WO | WO 03/005068 A2 | | 1/2003 |

OTHER PUBLICATIONS

Brilland et al, "Slanted gratings UV-written in photosensitive cladding fibre", Electronics Letters, IEE Stevenage, GB, vol. 35, No. 3, Feb. 4, 1999, pp. 234-235, XP006011729.

* cited by examiner

*Primary Examiner*—Minsun Oh Harvey
*Assistant Examiner*—Tuan N. Nguyen
(74) *Attorney, Agent, or Firm*—Sughrue Mion, PLLC

(57) ABSTRACT

Disclosed is a Raman laser device (10) having a first cavity in which lasing occurs at a first frequency, and at least one second cavity in which lasing occurs at a second frequency. Thereby respective first and second waves inside the respective cavities are generated having a first power and a second power, respectively. Further, beams propagating outside the cavities are generated by coupling out a part of the first power and a part of the second power utilizing respective output mirrors. The part of the second power that is coupled out is attenuated without attenuating the complementary part of the second power remaining in the second cavity. The Raman laser device is characterized in that the part of the second power that is coupled out is attenuated utilizing at least one Fiber Bragg Grating (46, 62).

10 Claims, 3 Drawing Sheets

MULTIPLE OUTPUT RAMAN FIBER LASER WITH STABLE AND SMALL OUTPUT POWER FOR SEED APPLICATIONS

BACKGROUND OF THE INVENTION

The invention is based on a priority application EP03290493.0 which is hereby incorporated by reference.

The present invention relates to a Raman laser device having a first cavity in which lasing occurs at a first frequency, and at least one second cavity in which lasing occurs at a second frequency, thereby generating respective first and second waves inside the respective cavities having a first power and a second power, respectively, generating beams propagating outside the cavities by coupling out a part of the first power and a part of the second power, and attenuating that part of the second power that has been coupled out without attenuating the complementary part of the second power remaining in the second cavity.

Such a Raman laser device is per se known. Raman laser devices with more than one output wavelength are a promising means for second order pumping applications in optical telecommunication systems.

It is generally known in the field of optical telecommunication that optical signals propagating in a transmission line fiber may be amplified by a co-propagating or counter-propagating pump light wave by means of the Raman effect. Due to the Raman effect, pump light of a short wavelength undergoes a scattering interaction with the material of the fiber. Emitted light is shifted down in frequency. If the shifted down frequency matches the signal frequency, the signal may be amplified by stimulated Raman emission, in which signal light triggers the emission of scattered light.

The energy transfer may occur directly between a pump wave and the signal wave. Such a transfer is generally designated as first order pumping. Further, the first pump wave, that is the pump wave transferring energy to the signal, may itself be pumped by a second pump wave.

Such a pumping process including a second pump wave is called second order pumping.

In second order pumping applications, it is desirable to have a powerful second order pump wave pumping the fiber, which, along the fiber, transfers its power to the first order pump wave of longer wavelength. However, such an energy transfer premises that there is already a little power existing in the first order pump waves. Such a first order pump wave of little power is also called a seed. To generate such a seed, it is generally known to use laser diode sources in the 14xx nm range for launching the seeds in the fiber and to use a Raman laser emitting at a single powerful wavelength at about 1360 nm for pumping the seeds. However, to use laser diodes for launching the seeds requires multiplexing schemes that add cost to the device.

The power launched in the seeds should, on the one hand, be small in order to push forward the gain into the line fiber and consequently to improve the noise performance of the transmission. Further, the power in the seeds has to be above the lasing threshold in order to maintain a stable seed. Accordingly, it is desired to have a Raman laser device emitting at a powerful wavelength and at (at least) one seed wavelength simultaneously, the power emitted in the seed being stable and close to the lasing threshold.

The per se known Raman laser device mentioned at the outset emits simultaneously in the 1360 nm wavelength region and 14xx nm range. In order to have a stable power in the seeds in the 14xx nm range, the known laser works well above the lasing threshold (in the respective laser cavity/resonator) and the power of the seed wave that is coupled out of the laser is attenuated using a Long Period Grating (LPG). Such a Raman laser device is disclosed in the article "Dual-order Raman pump providing improved noise figure and large gain bandwidth", Proceedings OFC 2002 (Anaheim, Calif.) Postdeadline paper FB3by J C Bouteiller et al.

However, a Long Period Grating is sensitive to temperature. Further, in order to have a spectral width that is small enough to select different output wavelengths in the 14xx nm range, a Long Period Grating requires about 50 mm of length, which is not compatible with current demands for compactness in the respective field of Raman laser devices. In addition, due to a distinct sensitivity to its external environment, a Long period Grating needs a specific packaging.

SUMMARY OF THE INVENTION

In the light of the prior art outlined above, it is the objective of the present invention to provide for a Raman laser device with a small and stable output power for seed waves launched for second order pumping applications, which avoids the drawbacks that are associated with the utilization of Long Period Gratings.

This objective is achieved by a Raman laser device as mentioned at the outset, wherein the part of the second power that is coupled out is attenuated utilizing at least one Fiber Bragg Grating.

The proposed solution provides for the desired properties and can be implemented with ease. Particularly those conventional Raman laser devices that utilize Fiber Bragg Gratings as output mirrors can be modified by utilizing Fiber Bragg gratings that attenuate the wave that is coupled out. To distinguish between the present invention and conventional Raman laser devices equipped with Fiber Bragg Gratings as output mirrors, it should be kept in mind that conventional output mirrors are designed to achieve maximum output intensity. To achieve a maximum output intensity is prima facie contradictory to the requirement of achieving an attenuated wave.

Since only the part that is coupled out of the cavity is attenuated, the generation of the seed beam inside the cavity is not adversely affected. Accordingly, a stable seed wave can be generated inside the cavity while the power part of the seed wave in the fiber outside the cavity may be attenuated in order to improve the noise performance of the system.

It is preferred that the at least one Fiber Bragg Grating has a reflectivity that is higher than the reflectivity where highest output power is obtained.

An increased reflectivity reduces that part of the power that is coupled out of the cavity and increases the reflected fraction of energy that remains inside the cavity. Accordingly, it is promoted that the lasing threshold is lowered. Thus, the laser cavity will work well above the respective threshold and the output power will be stable.

It is, further, preferred that the at least one Fiber Bragg Grating is a slanted Fiber Bragg Grating.

A slanted Fiber Bragg Grating is a standard grating tilted during photo-inscription with an angle between the fringes and the normal of the fiber axis. A slanted Fiber Bragg Grating may easily be incorporated into the output section of a Raman laser device.

It is particularly preferred that the slanted Fiber Bragg Grating's attenuation is adjustable by varying the Fiber Bragg Grating's central wavelength.

In the case of a Raman laser device for second order pumping applications, it is advantageous that the power in the seed is adjustable. It is per se known that the attenuation of a slanted Fiber Bragg Grating may be adjusted by applying mechanical stress or temperature variations.

Accordingly, it is preferred to utilize such a known adjustment mechanism, that is to adjust the slanted Fiber Bragg Grating's attenuation by applying mechanical stress or heat.

In order to achieve the desired reflectivities, it is preferred that the Raman laser device comprises a control device that adjusts the Fiber Bragg Grating's reflectivity.

As an alternative to adjusting the reflectivity of the output mirror, it is preferred to attenuate the part of the second power that is coupled out by an additional slanted Fiber Bragg Grating that is located spatially apart from the output mirror.

For reasons of manufacturing simplicity, it is preferred that the output mirror is a Fiber Bragg Grating, too. This provides for the additional advantage that the properties of the combination of the output mirror grating and the attenuating slanted grating add. Hence, the properties of the combination may be tuned by the design of a single one of both gratings or by the design of both gratings.

It is, therefore, preferred, that at least one of the Fiber Bragg Gratings serves as an output mirror and that the slanted Fiber Bragg Grating Fiber is adjustable. It is particularly preferred that both gratings are independently adjustable in order to obtain a maximum degree of freedom in adjusting the combination.

It is further preferred that the slanted FBG is used for both closing the cavity by reflection and attenuating that part of the power that is coupled out.

It is, further, preferred that the part of the second power that is coupled out is attenuated by a superposition of two slanted Fiber Bragg Gratings or the superposition of at least one slanted Fiber Bragg Grating and a standard Fiber Bragg Grating.

It has emerged that such a superposition provides for properties associated with the utilization of two separate gratings while maintaining the advantage of a single grating concerning the cost incurred.

Further advantages can be taken from the description and the enclosed drawings in which like numerals refer to like elements.

It is to be understood that the features mentioned above and those yet to be explained below can be used not only in the respective combinations indicated, but also in other combinations or in isolation, without leaving the scope of the present invention.

BRIEF DESCRIPTION OF THE DRAWINGS

Embodiments of the invention are shown in the drawings and will be explained in more detail in the description below.

In the drawings:

In FIG. 1, identification reference 10 designates a Raman laser device in its entirety. Raman laser device 10 comprises a continuous wave pump laser 12, a length 20 of Raman amplifying fiber, a first group 18 of wavelength selectors, a second group 22 of wavelength selectors, and a third group 24 of wavelength selectors.

Figure 1:
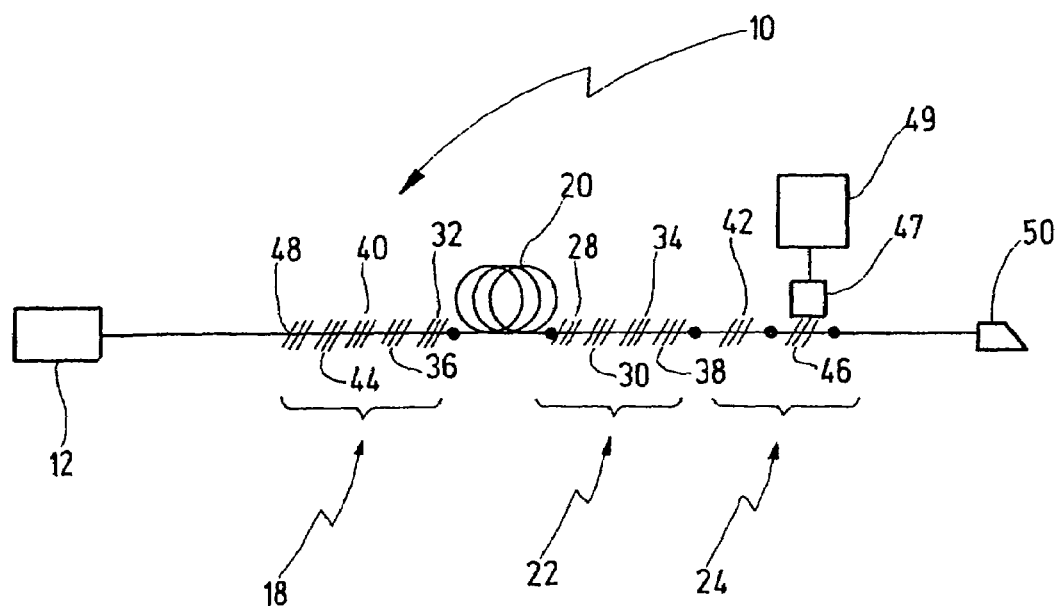
FIG. 1 depicts, schematically, a Raman laser device according to an embodiment of the invention.

When viewed in the direction of light propagating from continuous wave pump laser 12 through length 20 of Raman amplifying fiber, the first group 18 of wave-length selectors is arranged previous to intermediate span 20 of fiber, whereas the second group 22 of wavelength selectors and the third group 24 of wavelength selectors are arranged behind intermediate span 20 of fiber.

The length of Raman amplifying fiber 20 between pump laser 12 and wavelength selector 28 forms an embedded pump-cavity in which the pump wave emitted by pump laser 12 is reflected once by FBG 28. Likewise, wavelength selectors 30 and 32, wavelength selectors 34 and 36, and wavelength selectors 38 and 40 form further cavities embedded in length 20 of Raman amplifying fiber.

Wavelength selectors 28–40 may be realized as Fabry-Perot interferometers. Alternatively, they may be realized as Fiber Bragg Gratings that are centered around the respective selected wavelengths. For a continuous pump wavelength of 1117 nm, wavelength selectors 30 and 32 may be centered around a wavelength of 1167 nm wavelength, that is one Stokes apart from the 1117 pump wavelength. Likewise, wavelength selectors 34 and 36 may select a wavelength of 1223 nm and wavelength selectors 38 and 40 may select a wavelength of 1284 nm.

The pump light wave emitted by continuous pump wave laser 12 is successively downshifted in frequency to the selected wavelengths of 1167 nm, 1223 nm and 1284 nm by means of the Raman effect. Accordingly, the selected wavelengths are, in general, chosen to be spaced apart from each other by the wavelength equivalent of one Stokes frequency.

As is generally known, the Stokes frequency indicates the amount of the frequency shift which is due to the Raman effect. Accordingly, a wave having a frequency shifted down from the frequency of a pump-wave by one Stokes frequency, is often called a Stokes. Since all wavelength selectors 28 to 40 have a high reflectivity in the order of 99%, light of the selected frequencies resonates in the respective cavity formed by the corresponding pair of wavelength selectors 30, 32; 34, 36, and 38, 40, respectively, without substantive losses.

In contrast thereto, a plurality of further cavities is provided that emit the desired plurality of wavelengths, each cavity emitting a single wavelength. In FIG. 1, two such cavities are formed by pairs 42, 44 and 46, 48 of wavelength selectors. However, more than two of such cavities may be provided, depending on the desired number of output wavelengths of Raman laser device 10.

The two cavities that provide for the output wavelengths are designated as a first cavity and a second cavity below. Wavelength selector 44 of the first group 18 of wavelength selectors and wavelength selector 42 from the third group 24 of wavelength selectors form the first cavity, in which lasing occurs at a first output frequency. Likewise, wavelength selector 46 of the third group 24 of wavelength selectors and wavelength selectors 48 of the first group 18 of wavelength selectors form the second cavity in which lasing occurs at a second frequency.

Accordingly, respective first and second waves having a first power and a second power are generated in the first cavity and the second cavity, respectively. Since wavelength selector 42 and wavelength selector 46 of the third group 24 of wavelength selectors show a reflectivity that is reduced in comparison to the 99% reflectivity of the wavelength selectors of the first group 18 and second group 22 of wavelength selectors, first and second beams are generated that are emitted by the respective cavity embedded in Raman amplifying fiber 20 by wavelength selectors 42, 44 and 46, 48, respectively.

Wavelength selector 42 may have a reflectivity of approximately 10%, whereas wavelength selector 46 may have a high reflectivity of more than 40%, in particular a reflectivity of approximately 60% in an embodiment of the present invention. In prior art devices, the reflectivity is, usually, lower than 40% and the output is not stable at low output power at 14xx nm. Accordingly, the first beam that is coupled out by wavelength selector 42 is more powerful than the second wavelength coupled out by wavelength selector 46. Both the first and the second wavelength of 1351 and 14xx nm, respectively, get out of the laser already through the same fiber. Wavelength selector 42 of the first cavity may have a center wavelength of 1351 nm and wavelength selector 46 of the second cavity may have a center wavelength of 1428 nm. Like the other waves mentioned before, both output waves are subsequent Stokes waves generated by means of the Raman effect in Raman laser device 10. The reflectivity of the Fiber Bragg Grating 46 may be adjusted by a known adjustment mechanism, that is by applying mechanical stress or heat by a respective means 47 controlled by a control device 49.

Figure 2:
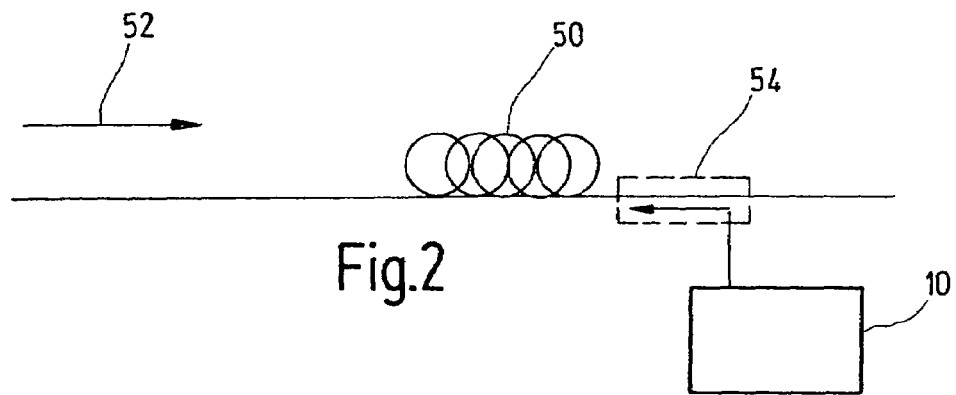
FIG. 2 shows, schematically, a line fiber span which is pumped by the Raman laser device of FIG. 1.

FIG. 2 shows, schematically, a line fiber 50 span which is pumped by the Raman laser device 10 of FIG. 1. Arrow 52 represents the direction of signals propagating in line fiber 50. Accordingly, signals propagate through line fiber 50 from the left to the right. The first and second waves that are generated by Raman laser device 10 are fed into line fiber 50 such that they propagate in the reverse direction, that is from the right to the left. To use such counterpropagating pump-waves instead of pump waves that co-propagate with signals reduces the generation of noise in line fiber 50.

The first (powerful) Stokes wave of potentially 1351 nm pumps the line fiber 50 with a power of approximately 1 W. Along line fiber 50, this Stokes will transfer its power to the 1428 (small power) nm wavelength which is launched as a seed in line fiber 50 by Raman laser device 10. A typical power of a seed wave as launched is lower than 100 mW. Further, power is transferred from the pumped seed wave to the signal wavelength, which is in range of 1530–1550 nm.

Figure 3:
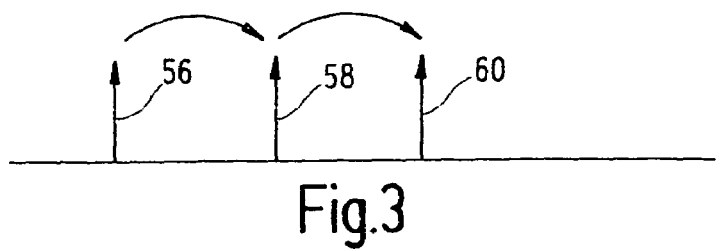
FIG. 3 illustrates the energy transfer in second order pumping applications

This transfer of energy is schematically depicted in FIG. 3, in which arrow 56 represents the center wavelength 1351 nm of the Stokes that is pumping line fiber 50 (first power coupled out from Raman laser device 10). Likewise, arrow 58 represents the center wavelength 1428 of the seed (second power coupled out of Raman laser device 10), and arrow 58 represents a center wavelength of the signals propagating in line fiber 50. The 1428 nm seed is called the first order pump, whereas the 1351 nm Stokes is called the second order pump. The condition for the 1351 nm pump Stokes to transfer its power to the 1428 nm seed wavelength while propagating along line fiber 50 is that already a small power exists in the seed.

According to the invention, a small but stable power in the seed is achieved by attenuating the second power that is coupled out of the Raman laser device utilizing at least one Fiber Bragg Grating.

Figure 4:
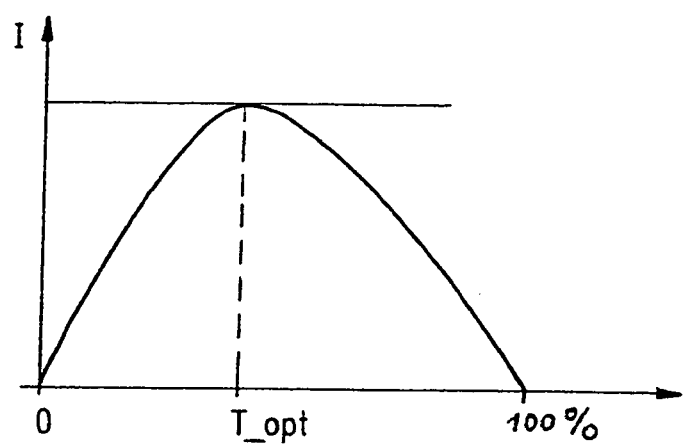
FIG. 4 the output intensity versus the transmission of an output coupler.

The attenuation can be achieved by a single Fiber Bragg Grating wavelength selector 46 that has a reflectivity that is higher than the reflectivity where highest output power is obtained. FIG. 4 shows the output intensity of a laser as a function of the transmission. As is generally known, the reflectivity is equal to 1-transmission. Accordingly, a maximum in transmission implies a corresponding minimum in reflectivity. As can be taken from FIG. 4, the output intensity I increases initially with increasing transmission up to a maximum value I_max at a certain transmission T_opt which is lower than the maximum of the transmission (100%). Increasing the transmission beyond T_opt leads to a falling intensity.

To achieve a high output intensity, i.e. a high output power, any output mirror that terminates a laser cavity is usually designed to have a transmission (and corresponding reflectivity) that leads to a maximum output intensity. This applies also to the case where a Fiber Bragg Grating is utilized as the output mirror. Such a utilization of a Fiber Bragg Grating having a transmission T_opt is generally known.

However, according to one embodiment of the present invention, the reflectivity (and transmission) of that particular Fiber Bragg 46 that is used to couple the seed beam out of the respective cavity of Raman laser device 10 is designed to show a suboptimal reflectiviy. Preferably, the suboptimal reflectivity is chosen such that it corresponds to transmission values left from the transmission value T_opt where maximum intensity occurs.

Accordingly, less power is coupled out of the respective laser cavity, and, therefore, more power remains in the respective laser cavity. Hence, two desired effects are achieved simultaneously: The increased amount of power remaining inside the respective laser cavity promotes or facilitates that the wave resonating in the cavity exceeds the lasing threshold. Thus, the stability of the wave resonating inside the cavity is enhanced. Since the stability of the emitted seed depends on the stability of the wave resonating inside the cavity, the stability of the emitted seed is also enhanced.

Further, by decreasing the amount of power that is coupled out, the power of the generated seed wave is attenuated. It should be noted that the respective values are increased and decreased in comparison to a case in which a maximum of output power is desired.

As an alternative, a classical Raman laser device 10 having embedded cavities is supplemented with additional attenuators realized by slanted Fiber Bragg Gratings that are centered at each output wavelength and that are located spatially behind the output mirror. In such an embodiment, the transmission and reflection characteristics of the two gratings just add.

A slanted Bragg Grating is a standard grating tilted during photo-inscription with an angle between the fringes and the normal of the fiber axis. Due to this angle, the grating couples a part of the guided mode power into the cladding modes in a contra-propagative direction. The attenuation spectral shape is then given by the envelope of the coupling into the cladding modes. By properly choosing the angle, it is possible to reduce or optimize the value of back-reflection (i.e the attenuation i.e the power coupled backward in the cladding modes) and therefore the coupling of the fundamental mode in the contra-propagative direction.

Figure 5:
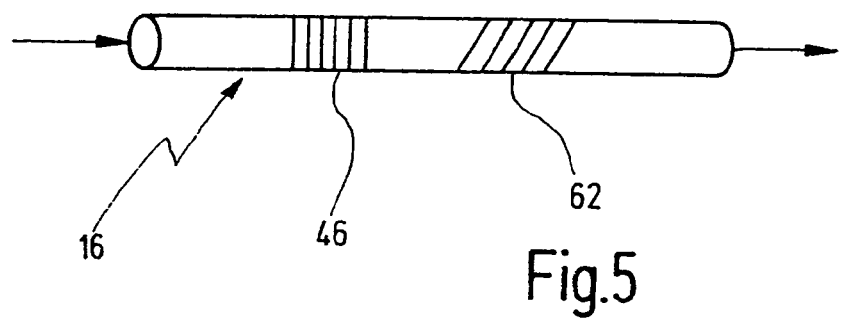
FIG. 5 schematically, a combination of a reflective grating and a slanted grating located in the output section of the Raman laser device.

FIG. 5 illustrates schematically a length of Raman amplifying fiber 16 having a reflective Fiber Bragg Grating 46 serving as the output mirror for generating the seed beam and having an added slanted Fiber Bragg Grating 62 located spatially behind the output mirror. Like the reflectivity of Fiber Bragg Grating 46, the attenuation of slanted Fiber Bragg Grating 62 may be adjusted by a known adjustment mechanism, that is by applying mechanical stress or heat by a respective means controlled by a control device.

Figure 6:
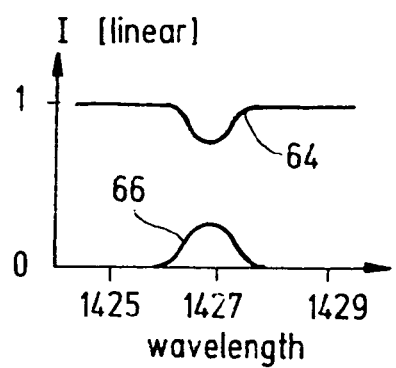
FIG. 6 the transmission/reflection of the reflective grating versus wavelength, FIG. 7 the transmission of the slanted Grating versus wavelength fore an optimised angle allowing no reflection.
Figure 7:
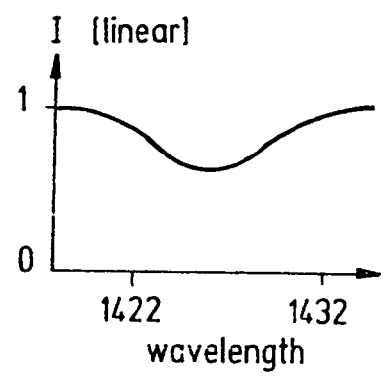

Curve 64 in FIG. 6 illustrates the transmission of the reflective Fiber Bragg Grating 46 and curve 66 shows the corresponding reflection. Curve 68 in FIG. 7 shows the attenuating transmission of the slanted Fiber Bragg Grating 68 in the radiative modes. As mentioned above, the transmission of the two gratings just add.

In the following, two variations of this solution are considered.

As a first variation, only a single slanted Fiber Bragg Grating 62 is used instead of the combination of a reflective Fiber Bragg Grating 46 and a slanted Fiber Bragg Grating 62. The secondary reflection of the slanted Fiber Bragg Grating 62 is then used to terminate the cavity at each output wavelength and to realize the function of reflection. The cladding mode wavelength is aligned on this secondary reflection wavelength and allows to transmit the output wavelength with an attenuation defined by the slanted Fiber Bragg Grating.

Figure 8:
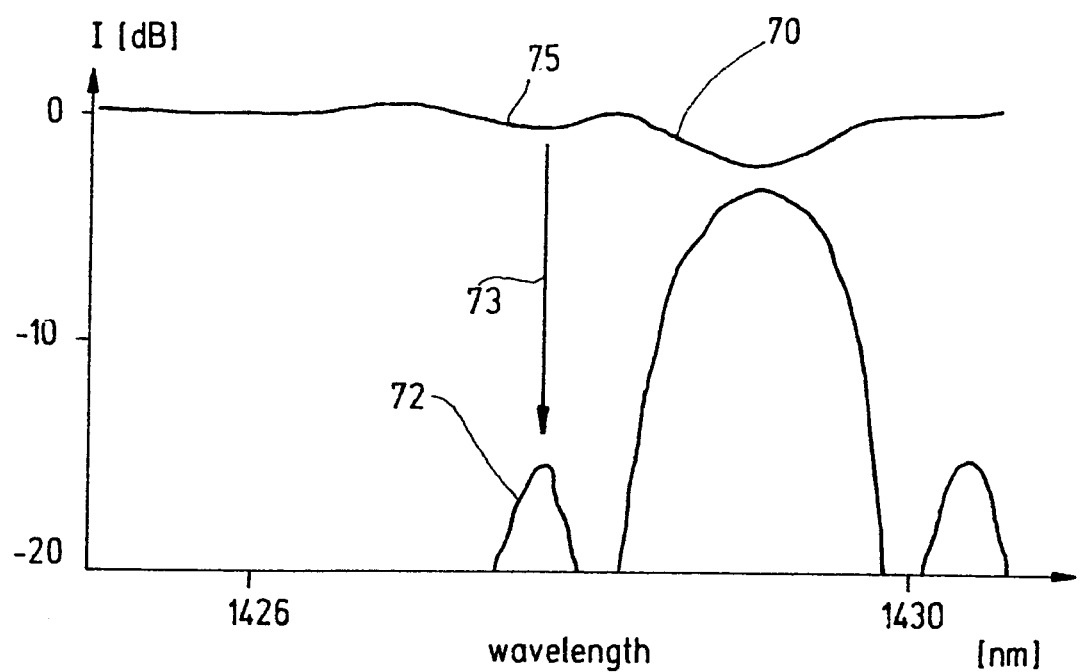
FIG. 8 the transmission an reflection spectrum of a single slanted Fiber Bragg Grating.

FIG. 8 illustrates resulting transmission and reflection properties that have been obtained by such a variation for coupling out a seed and attenuating same in order to achieve a stable low power seed. Curve 70 corresponds to the transmission of the slanted FBG. Lobe 75 represents the transmission in the radiation modes, as curve 68 in FIG. 7. By properly choosing the angle, it is possible to choose the appropriate value of attenuation in the cladding modes and the corresponding secondary reflection. Curve 72 depicts the reflection of the slanted FBG. The small lobes on the right and left are due to the secondary reflection and the main lobe between the small lobes is caused by the main reflection corresponding to the mode that is transmitted and back-reflected as a guided mode.

The high reflection is the main reflection corresponding to the guided mode and the small lobes are caused by the secondary reflection of this guided mode. It is the secondary reflection 72 on the left that is used to assume the reflection function. Arrow 73 from the first small lobe 75 of the transmission (on curve 70) to the left secondary reflection of curve 72 shows the wavelength where the laser operates.

The second variation provides a superposition of two slanted Fiber Bragg Gratings or of one FBG and one slanted FBG or the equivalent Moiré Grating.

Figure 9:
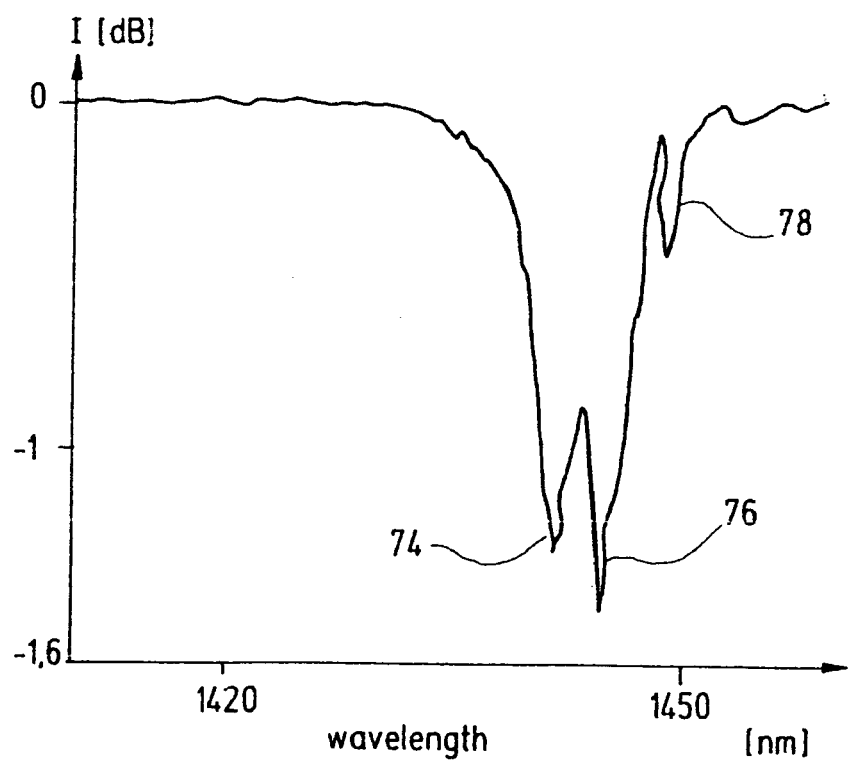
FIG. 9 the transmission spectrum versus wavelength of a superposition of two slanted Fiber Bragg Gratings.

The resulting transmission spectrum versus wavelength of a superposition of two slanted Fiber Bragg Gratings is shown in FIG. 9. The primary reflection of the first slanted Fiber Bragg Grating is centered with the cladding mode of the second slanted Fiber Bragg Grating. Transmission minimum 74 corresponds to the radiation mode of the first slanted Fiber Bragg Grating while minimum 76 corresponds to the transmission of the first slanted Fiber Bragg Grating and the radiative mode of the second slanted Fiber Bragg Grating. Minimum 78 corresponds to the transmission of the second slanted Fiber Bragg Grating. Peak 76 is the one used.

The invention claimed is:

1. A Raman laser device comprising:
   a first cavity in which lasing occurs at a first frequency, and
   at least one second cavity in which lasing occurs at a second frequency, wherein the first cavity and the at least one second cavity generate a respective first and an at least one second wave inside the respective cavities having a first power and a second power, respectively,
   respective output mirrors that generate beams propagating outside the respective cavities by coupling out a part of the first power and a part of the second power without attenuating the complementary part of the second power remaining in the second cavity, and
   at least one fiber Bragg Grating that attenuates the part of the second power that is coupled out.

2. The Raman laser device of claim 1, wherein the at least one Fiber Bragg Grating has a reflectivity that is higher than the reflectivity where highest output power is obtained.

3. The Raman laser device of claim 2, wherein the at least one Fiber Bragg Grating is a slanted Fiber Bragg Grating.

4. The Raman laser device of claim 3, wherein the slanted Fiber Bragg Grating's attenuation is adjustable.

5. The Raman laser device of claim 4, wherein the slanted Fiber Bragg Grating's attenuation is adjusted by applying mechanical stress or heat.

6. The Raman laser device of claim 4, comprising a control device that adjusts the Fiber Bragg Grating's reflectivity.

7. The Raman laser device of claim 1, wherein the part of the second power that is coupled out is attenuated by a slanted Fiber Bragg Grating that is located spatially apart from the output mirror.

8. The Raman laser device of claim 7, wherein the output mirror is a Fiber Bragg Grating.

9. The Raman laser device of claim 7, wherein both the Fiber Bragg Grating serving as an output mirror and the slanted Fiber Bragg Grating Fiber are adjustable.

10. The Raman laser device of claim 1, wherein the part of the second power that is coupled out is attenuated by a superposition of two slanted Fiber Bragg Gratings or a slanted Fiber Bragg Gratings and a standard Fiber Bragg Grating.

* * * * *